United States Patent [19]

Wilwerding et al.

[11] Patent Number: 5,059,810
[45] Date of Patent: Oct. 22, 1991

[54] DISTANCE INDEPENDENT GAUGING SYSTEM

[75] Inventors: Dennis J. Wilwerding, Littleton; Norman L. Stauffer, Englewood, both of Colo.

[73] Assignee: Honeywell Inc., Minneapolis, Minn.

[21] Appl. No.: 500,685

[22] Filed: Mar. 28, 1990

[51] Int. Cl.5 .................. G01N 21/86; G01B 11/14
[52] U.S. Cl. .................................... 250/561; 356/375
[58] Field of Search .......................... 356/375–387, 356/4; 250/560, 561, 201.8

[56] References Cited

U.S. PATENT DOCUMENTS 3,002,098  9/1961  Watkins .............................. 356/375
4,622,502 11/1986  Maruo et al. ....................... 356/375
4,789,242 12/1988  Takagi et al. ...................... 356/375
4,827,120  5/1989  Stauffer ............................. 250/227

OTHER PUBLICATIONS

U.S. Ser. No. 202,074 filed by Stauffer on Jun. 3, 1988.

Primary Examiner—David C. Nelms
Assistant Examiner—LaCharles P. Keesee
Attorney, Agent, or Firm—Kinney & Lange

[57] ABSTRACT

An optical gauging system which includes an aperture positioned on an axis between two lenses at a distance from each equal to their respective focal lengths and, utilizing radiation from a remote object parallel to the axis, the system being operable to determine the position or size of the object regardless of its distance from the system.

29 Claims, 3 Drawing Sheets 5,059,810

DISTANCE INDEPENDENT GAUGING SYSTEM

BACKGROUND OF THE INVENTION

The present invention relates to apparatus for sensing the position or size of a remote object regardless of its distance away from the apparatus.

There are many applications for devices to detect the position of an object with respect to some fixed axis or to detect the size of an object from a remote location. For example, in robotics, it is desirable for the robot to be able to determine where a particular object it is seeking lies so that it can move toward the object for purposes of contact therewith. Also, in assembly line applications, it is often necessary to gauge the size of an object, such as a label on a container, from a remote location.

In the past, attempts to use optical systems to determine the position or size of a remote object have been hindered when the distance to the object is not known or when the distance may vary. The difficulty arises because the size of the object's image, as seen through the optical system, changes with changes in the distance to the object. Accordingly, the radiation sensor, which is employed to receive the image and to provide information concerning features of the object, produces different outputs with changes in the distance to the object. Thus, the output of the detector will be in error unless the objects can be controlled to always be at a predetermined fixed range or the distance can be measured so that the output can be modified to compensate for range differences. While these solutions are possible, they are unduly complicated and costly.

SUMMARY OF THE INVENTION

The present invention overcomes the problems of the prior art by providing an optical system useful with respect to remote objects so that the position of the image of the object or a point thereon will not change with changes in distance between the object and the apparatus. This is accomplished by utilizing two lenses with a small aperture located therebetween, which aperture is placed at the focal point of both lenses. Accordingly, radiation traveling to the first lens over paths parallel with the optic axis of the system will pass through the center of the aperture to arrive at the second lens at locations that are independent of the range to the object. Radiation from the object which is nearly parallel to the optic axis will pass through the aperture, in an amount depending on the aperture's size, and will form a spot of radiation around the point on the second lens where the parallel ray impinges. All other radiation from the object will be blocked. Thus, from a point on the remote object, the centroid of the rays representing that ray, which is exactly parallel to the optic axis, will impinge upon the second lens at a position which is independent of the object's distance with the other rays from that point on the object which pass through the aperture being uniformly arranged about the centroid position. If the object happens to be at the focal distance in front of the first lens, then all of the rays leaving the first lens will be parallel to each other in passing through the aperture to the second lens and the second lens will focus these rays to a point on its focal plane. A radiation sensor placed at the focal plane will then receive a sharp image of a portion of the object. If the object is not at the focal distance in front of the first lens, the image on the detector will be somewhat blurred but the center of the blurred radiation will continue to be the same as it was when in sharp focus. Thus, the position of each point on the remote object, as represented by the ray from that point which is parallel to the optic axis, will remain at the same position on the detector regardless of changes in the object's distance. When the size of the object is to be determined, two points or edges on the object, representing the extremities of the size to be measured, will be presented to the radiation detector at two locations and these locations will remain fixed regardless of changes in the distance to the object. Thus, the detector output will provide two values which may be used to determine the position and size of the object.

DETAILED DESCRIPTION OF THE PREFERRED EMBODIMENTS

Figure 1:
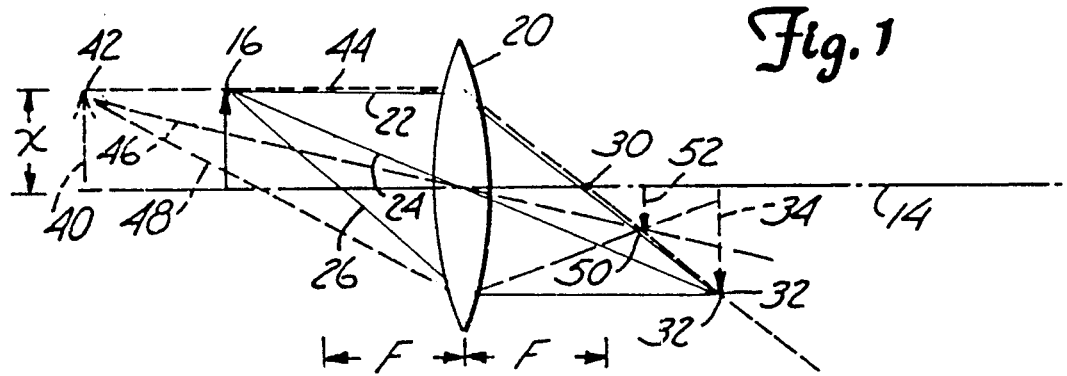
FIG. 1 shows an optical system without the present invention.

In FIG. 1, a remote object, shown as an arrow 10, has a first end 12 located on an axis 14 which may be the optic axis of the system. A point 16 on the tip of arrow 10 is located a distance X above axis 14.

An object lens 20, having a diameter equal to or greater than X, is shown centered about axis 14, which may be the optic axis of lens 20. Lens 20 is positioned to receive radiation from arrow 10 along a number of paths such as shown by solid lines 22, 24 and 26 emanating from point 16. Lens 20 has an effective focal length F and, accordingly, radiation from point 16, such as ray 22 which is parallel to axis 14, will be focused by lens 20 to a focal point 30. Similarly, radiation from point 16 which passes along ray 24 through the center of lens 20 will emerge unrefracted, and radiation along path 26 will be refracted such that an image of point 16 will appear at a point 32, the tip of an inverted arrow image 34.

While not shown in FIG. 1, if a detector, such as will be described in connection with FIGS. 3 and 4, were to be placed along axis 14 to sense the radiation of arrow image 34, it could be made to sense the position of the point 32 with respect to axis 14, and one could then determine the position of point 16 with respect to axis 14 so long as arrow 10 remained at the position shown in FIG. 1.

Unfortunately, however, if arrow 10 moves with respect to lens 20 to a position such as shown by dashed line 40, radiation from the arrow tip 42 will now pass along rays shown by dashed lines 44, 46 and 48 to lens 20. These rays will now be focused at a point 50, and the image of arrow 40 will now appears as dashed line inverted arrow 52. Obviously, the size of arrow 52 is much smaller than the size of arrow 34 and point 50 is much closer to axis 14 than point 32. Accordingly, if the same sensor is used to sense the position of point 50, it will produce an entirely different output than was the case for position of point 32. It is seen that the output of the radiation sensor can not be trusted to produce a value indicative of the position of the arrow tip 16 or of the size of arrow 10 unless the arrow remains fixed with respect to lens 20, or other measuring apparatus is used to determine the range and the output is compensated.

Figure 2:
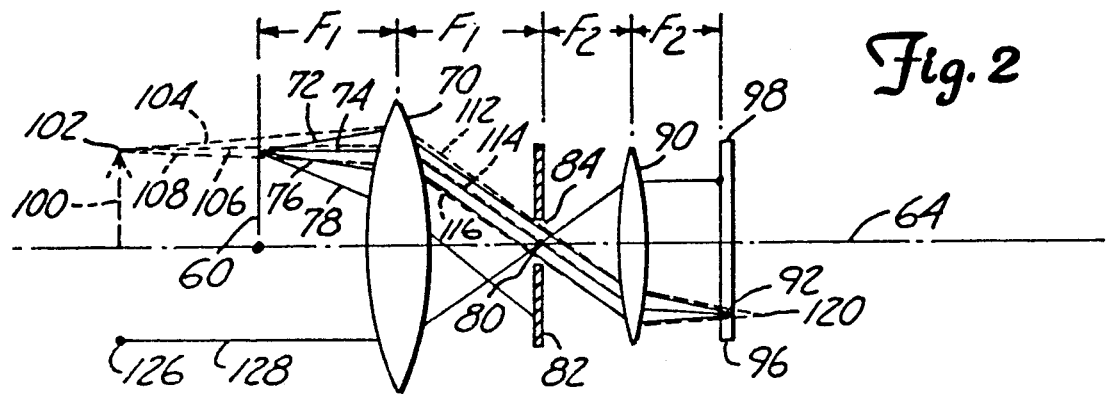
FIG. 2 shows the optical system of the present invention.

This difficulty is overcome in FIG. 2, which is arranged similarly to FIG. 1 but with additional components provided for in the present invention. In FIG. 2, an object shown as arrow 60 has one end 62 on an axis 64, which may be the optical axis of the system, and an arrow tip at a point 66. An object lens 70 is positioned on axis 64 at a distance which is shown, for convenience hereafter, at its effective focal distance $F_1$ from arrow 60. It should be understood that, in practice, arrow 60 may be at any distance from lens 70 when the present invention is utilized. Radiation from point 66 travels to lens 70 along a variety of paths such as is shown by solid lines 72, 74, 76 and 78. As was the case in connection with FIG. 1, the ray 74 traveling parallel to axis 64 will be refracted to pass through the focal point 80 of lens 70, but now a radiation blocking member 82 having an aperture 84 therein is placed on axis 64 so that aperture 84 is centered about focal point 80.

Depending upon the size of aperture 84, only a few rays from the point 66 of arrow 60, such as shown by paths 72, 74 and 76, will pass through aperture 84 and all others, such as ray 78, will be blocked. In FIG. 2, since arrow 60 was placed at the focal point of lens 70, the rays 72, 74 and 76 will emerge from lens 70 parallel to each other and will pass through aperture 84 to create a spot of light the size of aperture 84 on a second lens 90 which is located on the other side of aperture 84 by a distance $F_2$ equal to the focal length of lens 90. Accordingly, rays 72, 74 and 76 will be focused by lens 90 to a point 92 located at the focal plane a distance $F_2$ in back of lens 90. If a radiation sensor 94, which will be described in connection with FIGS. 3 and 4, is positioned to receive the radiation at point 92, its output on conductors 96 and 98 will be indicative of the position of point 92. The signal on conductors 96 and 98 may then be fed to suitable utilization apparatus, such as will be described in connection with FIG. 6, for purposes of producing an output signal which can be used to guide a robot or indicate the position of point 66 or the size of arrow 60.

If arrow 10 is located at a different position, for example that shown by dashed line 100, radiation from its tip 102 will pass to lens 70 along paths shown as dashed lines 104, 106 and 108. Path 106, like path 74, is parallel to axis 64 and so emerges from lens 70 along the same line as path 74 and will pass through aperture 84 and strike lens 90 at the same point as it did before. Paths 104 and 108 are not quite parallel to axis 64, and form a cone of a relatively small angle which passes through lens 70 and through aperture 84 in a slightly conical fashion shown by rays 112, 114 and 116, and will impinge on lens 90 at slight angles to each other. These rays will be focused by lens 90 to a point 120 which is seen to be moved to the right from point 92 by a small amount in FIG. 2. Accordingly, the image on detector 94 will now be a blurred image, or a spot of light centered around point 92, but no longer in focus as was above.

However, since, as will be described in connection with FIGS. 3 and 4, the detector 94 measures the distance to the center of the spot of light about point 92, this center will be the same as it was before, i.e. point 92, and accordingly, the output of sensor 94 will remain the same. Thus, the operator or robot can determine the position of the tip 66 of arrow 60 regardless of the distance between arrow 60 and lens 70.

If it is desired to determine size, for example, a label on a container, which can be represented by the distance between points 102 and 126 in FIG. 2, the system will operate in substantially the same fashion. As seen, radiation from point 126 will pass along a path 128 to lens 70 where it will be refracted to pass through the focal point 80 to lens 90 where it will again be refracted and focused at a point 132 on sensor 94. In this case, sensor 94 may be like that shown, for example, by my copending application Ser. No. 202,074 entitled "Position Responsive Apparatus", filed June 3, 1988 and assigned to the assignee of the present invention, to produce an output indicative of the distance between points 132 and 92 on the sensor 94 which would then be indicative of the distance between points 102 and 126 on the object being measured.

It is thus seen that regardless of the object distance, the points on the object will be imaged on the detector 94 at the same position so long as the aperture 84 is placed at the focal position of both lenses 70 and 90. As noted above, however, the position of point 60 or the distance between points 102 and 126 is limited by the diameter of lens 70 and, accordingly, lens 70 should be made large enough to measure the desired features on the object.

Also, as mentioned above, while in FIG. 2, arrow 60 has been shown at the focal distance of $F_1$ of lens 70 in its nominal or starting position, this is not necessarily required since, as seen, the light from point 66 will be directed to point 92 regardless of the object's distance. Only the focus changes with changes in object distance and not its position on the sensor. It should also be noted that as the aperture hole is decreased in size, the depth of focus on the detectors increases, but there will be a reduction in the sensitivity. It should be further noted that it is possible, in FIG. 2, to use an elongated slit aperture in place of the circular aperture 84. The slit would be aligned in a direction normal to the sensor 94 and the configuration would result in increased sensitivity since the aperture area would be larger to collect more light without moving the object feature in the sensor row direction.

Figure 3:
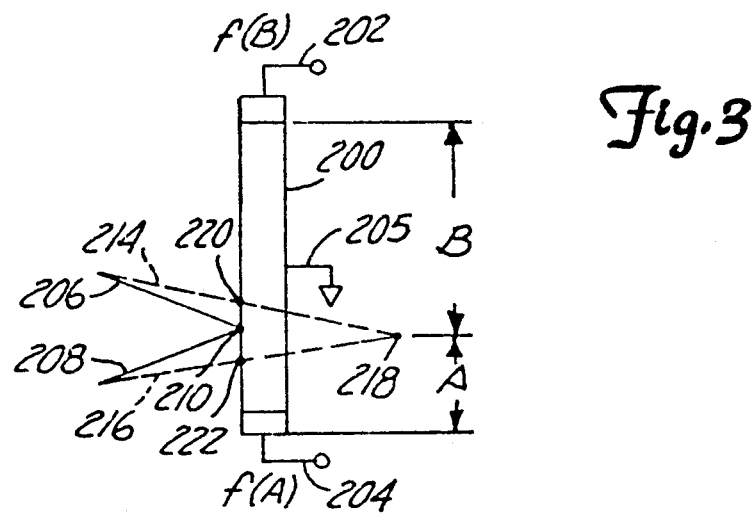
FIG. 3 shows a radiation detector for use in one embodiment of the present invention.

FIG. 3 shows an elongated sensor 200 which is useful in one embodiment of the present invention. Sensor 200 may be of the type referred to as a "lateral effect photodiode" sold by United Detector Technology Company under the designation LSC-30D, the S3261 sensor sold by Hitachi, or may be a sensor like that shown in the Norman L. Stauffer U.S. Pat. No. 4,827,120. Sensor 200 operates to produce an output on conductors 202 and 204 indicative of the position along the length of the sensor where radiation impinges. More specifically, as radiation strikes the detector, current is generated from that point to the ends. A ground connection 205 is shown to complete the circuit. The current in conductor 202 is a function f(B) of the amount of current flowing out the upper end of sensor 200 and the current in conductor 204 is a function f(A) of the current flowing out of the lower end of sensor 200 where A and B are the respective distances to the point of radiation impingement.

In FIG. 3, two rays 206 and 208 are seen to be focused at a point 210 on sensor 200 which represents the condition in FIG. 2 above when the object is in sharp focus on the sensor. Point 210 is a distance A above the lower end of sensor 200 and a distance B below the upper end of sensor 200. In this case, the output from conductors 202 and 204 may be processed, as will be described in connection with FIG. 6, to provide an indication of the distance A or B. If, on the other hand, the radiation is not sharply focused, as is the case in FIG. 2 when the object changes position, rays such as shown by dashed lines 214 and 216 will be focused at a point 218 to the right of point 210. A spot of radiation shown between points 220 and 222 will be received on sensor 200 as a blurry image of the point on the remote object. However, sensor 200 responds to a spot of light by producing an output on conductors 202 and 204 representative of the position of the center of the spot and, as seen, the center corresponds to point 210. Thus, even though the position of the object has changed, the output from sensor 200 has not and an accurate indication of the location of the point on the remote object is determined.

Figure 4:
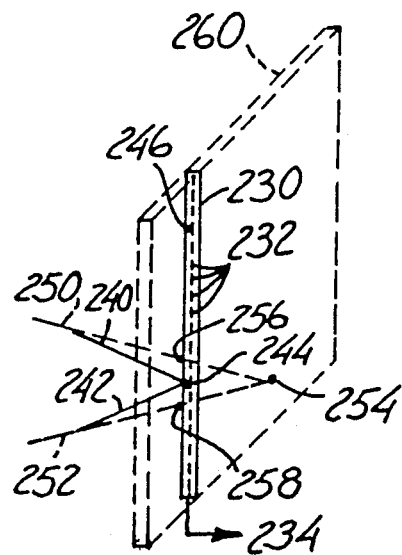
FIG. 4 shows an alternate type of radiation detector for use in another embodiment of the present invention.

In FIG. 4, an elongated sensor 230 is shown which may be of the type shown in the my co-pending U.S. patent application Ser. No. 202,074 and which is useful in another embodiment of the present invention. Sensor 230 comprises a plurality of detectors such as detectors 232, for example. Sensor 230 operates to produce an output shown by arrow 234 to a microprocessor (not shown) which is programmed to determine where radiation strikes sensor 230 along its length. The advantage of sensor 230 is that it can determine the positions of a number of points of radiation impingement simultaneously thus allowing determination of distance between two or more of them. An example of such use is explained in my above referred-to patent application Ser. No. 202,074.

In FIG. 4, radiation from the object along paths 240 and 242 is seen focused at a point 244 as was the case in FIG. 2 when the object was at the focal distance of lens 70. In this case, an output from the sensor 230 shown by arrow 234 would be used to compute the position of point 244. If the size of an object were being determined, additional points such as point 246 would also be determined and the microprocessor would determine the distance between them as an indication of the desired size.

When the object is at a different distance, radiation therefrom would arrive along dashed lines 250 and 252, for example, and be focused at a point 254 behind the sensor 230. Now, a blurry image of the point will be seen by sensor 230 between points 256 and 258. The output from the sensor 230 shown by arrow 234 will change, but the microprocessor will determine where points 256 and 258 are on the sensor 230 and can determine from this information where the halfway point 244 is located. Thus, again, the system will determine position or size regardless of the distance to the object.

It should be noted that with detectors of limited size or predetermined dimensions, the magnification of the system can be changed simply by changing the ratio of the image lens effective focal length to the object lens effective focal length. Thus, the magnification of the system will be equal to:

$$\frac{F_2}{F_1}$$

Adjusting this magnification allows the use of any normal sized detector. It should also be noted that the detector need not be limited to a single linear direction, but may be a two-dimensional array such as is shown in FIG. 4 by dashed line 260. Array 260 may be a CCD like that used in a normal video camera. Such a two-dimensional array will receive images from points into and out of the plane of FIG. 2 as well as those described above at points 244 and 146. The position of the various points may then be analyzed by the micro computer to determine the size and shape of the object.

In some cases, the illumination provided by the natural ambient is insufficient to provide the necessary light for the systems of FIGS. 1 and 2 while, in some cases, the point that is desired to be checked on the remote object does not differ from its background sufficiently for the system to operate satisfactorily or, alternately, there are situations in which several objects may be in the field of view and only particular ones of the objects are desired to be used in the present system. In such cases, apparatus such as shown in FIG. 5 may be employed.

Figure 5:
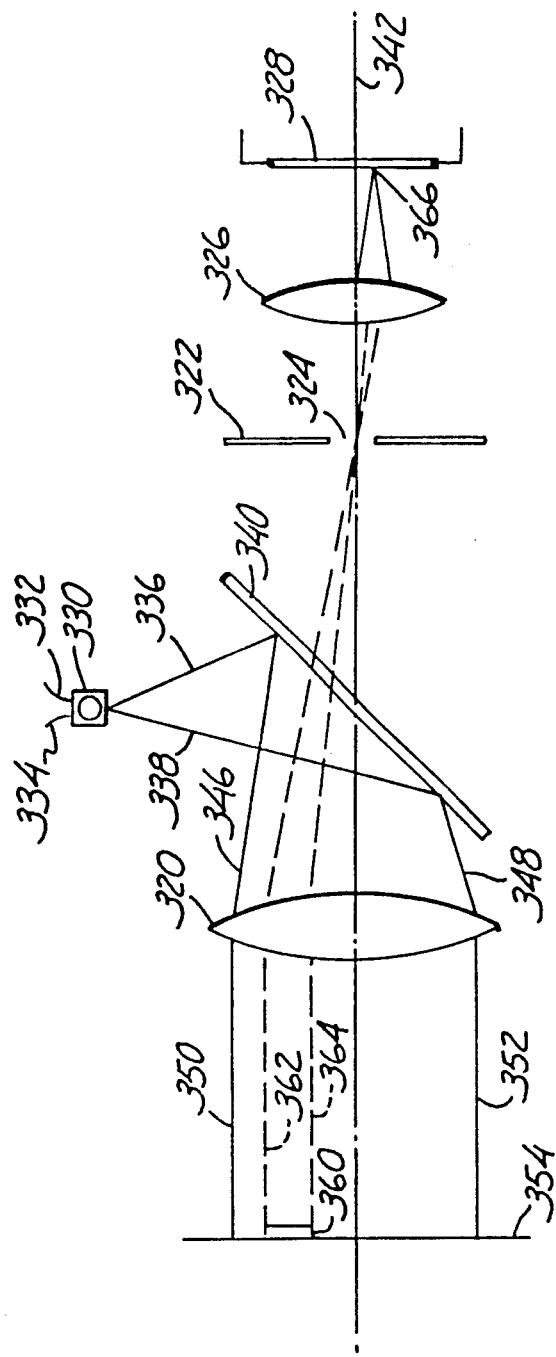
FIG. 5 shows a second embodiment of the present invention.

In FIG. 5, the object lens 320, aperture member 322 with an aperture 324 therein, image lens 326 and radiation sensor 328 may be the same as the system of FIG. 2. In FIG. 5, a light source 330, which may be a light emitting diode, is shown having input and output connections 332 and 334 and which is shown directing energy downwardly along rays such as shown as 336 and 338 to a partially silvered mirror or beam splitter 340 situated at an angle of about 45 degrees along the axis 342 at a position between the aperture member 322 and the object lens 320. Light source 330 and beam splitter 340 direct radiation to the left in FIG. 5 along paths such as shown as rays 346 and 348 through lens 320 where they are collimated to emerge as rays such as 350 and 352 directed to the remote object 354. This energy is reflected back from object 354 through the system including object lens 320, aperture 324, image lens 326 and sensor 328 to provide outputs the same as were in the case of FIG. 2. It is seen that by utilizing the light source 330, objects which are in relatively dim surroundings can be illuminated for use in the system.

In order to further improve the contrast of the system, the object 354 may be painted a light absorbing color, such as black, except in a particular area that is desired to be observed. In FIG. 5, to enhance the sensitivity of the system, a retroreflector 360 is shown mounted on the object 354 and will operate to take collimated rays from lens 320 and reflect them directly back along paths parallel to axis 342, as shown by dashed lines 362 and 364. Retroreflector 360 may be made of material such as is sold by 3M Company with the identification "High Gain Reflective Sheeting". The reflected rays will then pass through the system and be focused to a point 366 which is shown located at the surface of the sensor 328 which, in this case, is shown again as a lateral effect photodiode. It should be noted that if retroreflector 360 was a perfect device, all of the rays emanating from it would be parallel to the optic axis 342 so long as the object lens 320 perfectly collimated the light from source 330. In actual practice, however, the retroreflector is not perfect and there will be some small angles involved for the rays coming from the retroreflector to lens 320. Furthermore, in order to slightly improve the field of view of the system, light source 330 may be moved slightly closer to beam splitter 340 so as to slightly spread the beam from lens 320 on the surface 354. In any event, the resulting focus at point 366 will not be a point but will be an image of the object 360 the position of which will remain fixed regardless of the distance to the object.

Figure 6:
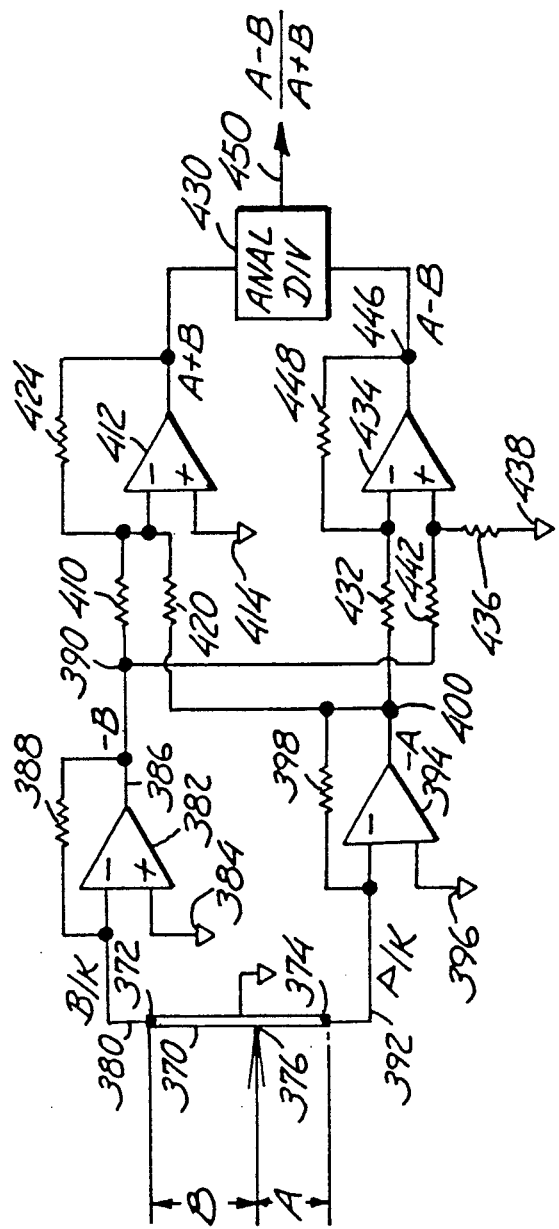
FIG. 6 shows a schematic block diagram of an electronic signal processing circuit for use with the present invention.

FIG. 6 shows an electronic circuit which may be utilized in connection with the lateral effect diode 328 or in connection with FIG. 2 when detector 94 is a lateral effect photodiode. In FIG. 6, the lateral effect photodiode 370 is shown producing output signals at its two ends 372 and 374, respectively, which are a function of the distances A and B to the point of impingement of radiation 376 thereon. A conductor 380 is connected to end 372 and its output is shown as a current of value B/K, where K is a constant, which signal is presented to the negative input terminal of a first amplifier 382, the positive input terminal of which is connected to ground at 384. An output terminal 386 is connected to input 380 by a resistor 388. With this connection, the output of amplifier 382 will be a voltage which varies in magnitude with the value $-B$, which signal is presented to a junction point 390.

In similar fashion, the lower end 374 of sensor 370 is connected by an input terminal conductor 392 to the negative input terminal of a second amplifier 394, the positive terminal of which is connected to ground at 396. A feedback resistor 398 is connected between the amplifier output 400 and the input conductor 392. The output from lower terminal 374 of sensor 370 is a current whose value varies with the ratio A/K and, accordingly, the output of amplifier 394 will be a voltage whose value varies with 31 A.

Terminal 390 is connected through a resistor 410 to the negative input terminal of a third amplifier 412 whose positive input terminal is connected to ground at 414. Output 400 of amplifier 394 is connected through a resistor 420 to the negative input terminal of amplifier 412 and the output terminal 422 is connected by a feedback resistor 424 to the negative input terminal of amplifier 412. As connected, the output on terminal 422 will be proportional to the value $A+B$, and this signal is connected to one input of an analog divider circuit 430.

Output terminal 400 is also connected through a resistor 432 to the negative input terminal of a fourth amplifier 434, the positive input terminal of which is connected by a resistor 436 to ground at 438. Junction point 390 at the output of amplifier 382 is also connected through a resistor 442 to the positive input terminal of amplifier 434, and the output terminal 446 is connected through a feedback resistor 448 to the negative input terminal of amplifier 434. As connected, the output at terminal 446 of amplifier 434 will be a signal whose magnitude varies with the value $A-B$. Terminal 446 is connected to the second input of analog divider circuit 430 which receives the signals $A+B$ and $A-B$ from the outputs 422 and 446, respectively, and divides these signals to produce a final output shown by arrow 450, which is a signal varying with the ratio $A-B/A+B$. This signal may be utilized by a microprocessor, not shown, to provide guidance for a robot or to indicate position or size as desired.

Figure 7:
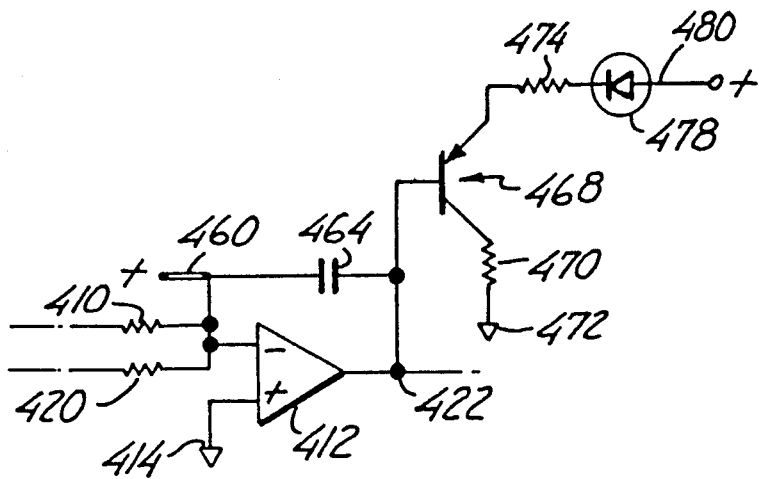
FIG. 7 shows an alternate arrangement of some of the components of FIG. 6.

In order to make the circuit of FIG. 6 less costly, the analog dividing circuit 430 may be eliminated as shown in FIG. 7. In FIG. 7, amplifier 412, which produces the output varying with $A+B$, is shown in a slightly different configuration where its output is used to control the light levels supplied by the light source 330 in FIG. 4 to, in effect, provide an automatic gain control. As before, resistors 410 and 420 connected to the outputs of amplifiers 382 and 394 in FIG. 6, are connected to the negative input terminal thereof and the output terminal is connected to a ground connection 414 as before. An additional connection is shown to the negative input terminal of amplifier 412 as a resistor 460 connected to a source of positive potential. The output of amplifier 412 on terminal 422 is no longer connected by a resistor, but is now connected by a capacitor 464 to the negative input terminal of amplifier 412. Output 422 is also connected to the base of a pnp transistor 468, the collector of which is connected through a resistor 470 to ground at 472, and the emitter of which is connected through a resistor 474 to the cathode of the LED 478 which can be used as the light source 330 in FIG. 5. The anode of LED 478 is connected to the positive source of voltage by a conductor 480.

Figure 8:
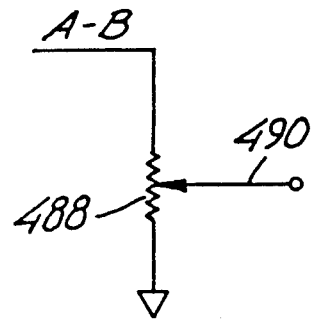
FIG. 8 shows a simple divider for use with FIG. 7.

By utilizing the apparatus of FIG. 7 in lieu of the analog divider circuit 430 and the elements eliminated in FIG. 6 by FIG. 7, the output of amplifier 434 will be a ratio $(A-B)/C$ where C is a constant proportional to $A+B$. More particularly, the input of amplifier 412 will be held at a constant value C by virtue of the fact that as the intensity of the from object 354 increases, so will the sum $A+B$ operating as inputs to amplifier 412, and thus the output from amplifier 412 will tend to increase. This output is, however, connected to the transistor 486 so as to reduce the light intensity being emitted by LED 478 and thus cause the sum of $A+B$ to be reduced back to the value C again. Thus, the value $A-B$, which is being produced by amplifier 434, may be presented to the upper terminal of, for example, a potentiometer, as shown in FIG. 8, having a resistance winding 488 and a movable wiper 490. Wiper 490 will be placed at a position along winding 488 equivalent to 1/C of the total value of resistance 488 which will therefore allow the voltage on wiper 490 to become $(A-B)/K$ and thus represent the position of the spot 376 on sensor 370 directly without the use of an expensive analog divider circuit. Alternately, the values of resistances 448 and 436 in FIG. 6 can be chosen so that the output of amplifier 434 is directly associated with the value $(A-B)/K$ without the use of the potentiometer of FIG. 8.

The values of the components shown in FIG. 6 are, in one preferred embodiment constructed by applicants, as follows:

| Resistor 388 | 10 Megohms |
| Resistor 398 | 10 Megohms |
| Resistor 410 | 10 K Ohms |
| Resistor 420 | 10 K Ohms |
| Resistor 432 | 10 K Ohms |
| Resistor 442 | 10 K Ohms |
| Resistor 436 | 50 K Ohms |
| Resistor 424 | 50 K Ohms |
| Resistor 448 | 50 K Ohms |
| Resistor 460 | 100 K Ohms |

Amplifiers 382, 394, 412 and 434 may be RCA amplifiers identified as CA3130 and analog divider circuit 430 may be an MPY 634B of Burr-Brown Company.

Although the present invention has been described with reference to preferred embodiments, workers skilled in the art will recognize that changes may be made in form and detail without departing from the spirit and scope of the invention.

What is claimed is:

1. Position sensing apparatus comprising:
first lens means having a first effective focal length and being positioned along a first axis to receive rays of radiation from a remote object, some of the rays being parallel to the first axis;
radiation blocking means, having an aperture therethrough, and positioned along the first axis at a distance proximate the first effective focal length from the first lens means so that only the rays of radiation from the object which are parallel and nearly parallel to the first axis pass through the aperture;
second lens means having a second effective focal length and being positioned along the first axis proximate the second focal length from the radiation blocking means to receive rays of radiation which pass through the aperture; and
radiation sensing means mounted along the first axis to receive radiation from the second lens means and to produce an output in accordance therewith, the center ray of the rays emanating from a point on the remote object being parallel to the first axis which ray is transmitted by the first lens through the aperture to the second lens and is transmitted by the second lens to intersect the radiation sensing means at a position which is independent of the distance between the remote object and the first lens means, the output being indicative of the position of intersection.

2. Apparatus for determining the position of at least one point on a remote object comprising:
first and second lens means;
radiation blocking means having an aperture therein, the aperture being positioned between the first and second lens means proximate the effective focal lengths thereof; and
sensing means having a length and being positioned proximate the effective focal length of the second lens means, radiation from the point on the remote object passing parallel to a predetermined axis, passing through the aperture and being directed by the second lens to a position along the length of the sensing means which is independent of the distance to the remote object.

3. Apparatus for use with a radiation sensor for determining the position of at least one predetermined point on a remote object with respect to a first axis comprising:
first and second lens means mounted along the first axis so that a first location on the first axis is between the first and second lens means at a distance substantially equal to the effective focal length of both; and
radiation blocking means having an aperture therein, the aperture being positioned to include the first location, the second lens means being operable to direct radiation which originates at the predetermined point on the remote object and which passes parallel to the first axis through the first lens means and through the aperture to the second lens means to a position on the sensor which is independent of the distance to the remote object.

4. Apparatus according to claim 3 wherein the first axis is the optic axis of the apparatus and coincides with the optic axes of the first and second lens means.

5. Apparatus according to claim 3 wherein the aperture is an elongated slot.

6. Apparatus according to claim 3 wherein the sensor is a lateral effect photodiode.

7. Apparatus according to claim 3 wherein the sensor is a row of individual radiation detectors.

8. Apparatus according to claim 7 wherein the detectors are CCD devices.

9. Apparatus according to claim 3 wherein the sensor is a two dimensional array of individual radiation detectors.

10. Apparatus according to claim 9 wherein the detectors are CCD devices.

11. The method of sensing the position of at least one point on a remote object comprising the steps of:
A. placing a first lens means on the axis to receive radiation from the point parallel to the axis, the first lens means focusing the radiation at a focus point;
B. placing a light blocking member having an aperture therethrough on the axis with the aperture about the focus point;
C. placing a second lens means on the axis at a distance from the aperture equal to the effective focal length of the second lens means, radiation from the point on the object passing through the first lens means and the aperture to the second lens means to be focused thereby; and
D. placing radiation detector means to receive the radiation focused by the second lens means, the radiation detector means having an output indicative of the position of the radiation on the detector means which position is indicative of the distance between the point and the axis and which remains constant regardless of the distance between the object and the first lens means.

12. The method of sensing the distance between two points on a remote object comprising the steps of:
A. placing a first lens means on the axis to receive radiation from the points parallel to the axis, the first lens means focusing the radiation at a focus point;
B. placing a light blocking member having an aperture therethrough on the axis with the aperture about the focus point;
C. placing a second lens means on the axis at a distance from the aperture equal to the effective focal length of the second lens means, radiation from the points on the object passing through the first lens means and the aperture to the second lens means to be focused thereby; and
D. placing radiation detector means to receive the radiation focused by the second lens means, the positions of the radiation on the detector means being indicative of the distance between the points and remaining constant regardless of the distance between the object from the first lens means.

13. Apparatus of the class described comprising: first lens means mounted at a first position
on a first axis to receive radiation from a remote object;
radiation blocking means mounted on the first axis with an aperture therethrough located at a distance from the first lens means substantially equal the effective focal length of the first lens means so that radiation from the remote object, parallel to the first axis, passes through the aperture;

second lens means mounted on the first axis at a distance from the aperture substantially equal to the effective focal length of the second lens means; and radiation sensing means positioned to receive radiation from the second lens means, the radiation sensing means producing an output indicative of the position of the center of the energy received which position does not change with changes in the distance to the remote object.

14. Apparatus according to claim 13 wherein the radiation sensing means is a lateral effect photodiode.

15. Apparatus according to claim 13 wherein the radiation sensing means comprises a plurality of individual radiation detectors in a row.

16. Apparatus according to claim 15 wherein the detectors are CCD devices.

17. Apparatus according to claim 13 wherein the radiation sensing means comprises a plurality of individual detectors arranged in a two dimensional array.

18. Apparatus according to claim 17 wherein the detectors are CCD devices.

19. Apparatus according to claim 13 wherein the radiation sensing means comprises a plurality of individual detector pairs arranged in a row and each pair is positioned behind a small lenslet.

20. Apparatus according to claim 19 wherein the detectors are CCD devices.

21. Apparatus according to claim 13 wherein the aperture is an elongated slot arranged substantially perpendicularly to the sensor.

22. Apparatus according to claim 3 further including beam splitter means positioned along the axis between the first lens means and the aperture and a source of radiation positioned to direct radiation to the beam splitter and from the beam splitter to the remote object to provide reflected energy therefrom which becomes the rays from the object to the first lens means.

23. Apparatus according to claim 22 wherein the object includes a retroreflective portion to increase the intensity of the rays to the first lens means.

24. Apparatus according to claim 23 wherein the object is light absorbing to further increase the contrast between the object and the retroreflective portion.

25. Apparatus according to claim 22 wherein the sensor is a lateral effect photodiode having a first output indicative of the distance between one end of the sensor and the center of radiation on the sensor.

26. Apparatus according to claim 25 wherein the sensor has a second output indicative of the distance between the other end of the sensor and the center of radiation on the sensor.

27. Apparatus according to claim 26 further including signal processing means to receive the first and second outputs and to produce a resultant output indicative of the ratio to the second output to the first output.

28. Apparatus according to claim 27 wherein the signal processing means includes an analog divider.

29. Apparatus according to claim 27 wherein the signal processing means includes a feedback circuit to provide the first output to the light source so that the intensity of the light source varies to hold the first output at a predetermined value.

* * * * *